(12) United States Patent
Teshome et al.

(10) Patent No.: US 10,395,036 B2
(45) Date of Patent: Aug. 27, 2019

(54) CONTINUED RUNTIME AUTHENTICATION OF INFORMATION HANDLING SYSTEM (IHS) APPLICATIONS

(71) Applicant: Dell Products, L.P., Round Rock, TX (US)

(72) Inventors: Abeye Teshome, Austin, TX (US); Ricardo L. Martinez, Leander, TX (US); Charles D. Robison, Buford, GA (US); David Konetski, Austin, TX (US); Girish S. Dhoble, Austin, TX (US); Carlton A. Andrews, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 211 days.

(21) Appl. No.: 15/460,804

(22) Filed: Mar. 16, 2017

(65) Prior Publication Data
US 2018/0268145 A1 Sep. 20, 2018

(51) Int. Cl.
*G06F 21/57* (2013.01)
*G06F 21/52* (2013.01)

(52) U.S. Cl.
CPC ............ *G06F 21/572* (2013.01); *G06F 21/52* (2013.01); *G06F 2221/033* (2013.01); *G06F 2221/2139* (2013.01)

(58) Field of Classification Search
None
See application file for complete search history.

(56) References Cited

U.S. PATENT DOCUMENTS

| | | | | | |
|---|---|---|---|---|---|
| 5,060,777 | A | * | 10/1991 | Van Horn | G07D 3/00 194/317 |
| 5,119,916 | A | * | 6/1992 | Carmen | G07D 5/08 194/210 |
| 5,139,128 | A | * | 8/1992 | Carmen | G07F 1/048 194/343 |
| 5,325,092 | A | * | 6/1994 | Allen | H03M 7/425 341/65 |
| 5,745,678 | A | * | 4/1998 | Herzberg | G06F 21/10 705/51 |
| 6,968,456 | B1 | * | 11/2005 | Tripathi | G06F 21/64 707/999.009 |

(Continued)

OTHER PUBLICATIONS

Boehme (Axel Boehme, "The RAIDn Algorithm—How Does it Compare?", Tandberg Data found at www.storagesearch.com/tangerg-radin-art.html, Jul. 2004).*

*Primary Examiner* — Piotr Poltorak
(74) *Attorney, Agent, or Firm* — Fogarty LLP (57) ABSTRACT

Systems and methods for continued runtime authentication of Information Handling System (IHS) applications. In an illustrative, non-limiting embodiment, an IHS may include one or more processors and a memory coupled to the one or more processors, the memory including program instructions stored thereon that, upon execution by the one or more processors, cause the IHS to: receive a command to execute an application; initially verify a plurality of tokens, where a first token is provided by the application, a second token is provided by an application manager, and a third token is provided by a hardware component within the IHS; and execute the application in response the initial verification being successful.

17 Claims, 4 Drawing Sheets

(56) References Cited

U.S. PATENT DOCUMENTS

| | | | | |
|---|---|---|---|---|
| 8,200,955 B2* | 6/2012 | Wisecup | G06F 9/4416 | 713/1 |
| 8,719,586 B1* | 5/2014 | Paleja | G06F 21/121 | 705/57 |
| 8,782,434 B1* | 7/2014 | Ghose | G06F 9/3851 | 713/190 |
| 9,208,620 B1* | 12/2015 | Bortnak | G07B 17/0008 | |
| 9,286,603 B2* | 3/2016 | Fung | G06Q 20/20 | |
| 9,485,255 B1* | 11/2016 | Avital | H04L 63/10 | |
| 9,536,088 B1* | 1/2017 | Igotti | G06F 21/53 | |
| 9,838,379 B1* | 12/2017 | Bryan | H04W 76/10 | |
| 9,866,393 B1* | 1/2018 | Rush | H04L 9/3247 | |
| 10,043,036 B1* | 8/2018 | Dawkins | G06F 21/6254 | |
| 10,110,385 B1* | 10/2018 | Rush | H04L 9/3247 | |
| 2002/0073316 A1* | 6/2002 | Collins | G06F 21/572 | 713/174 |
| 2002/0165971 A1* | 11/2002 | Baron | H04L 63/0281 | 709/228 |
| 2002/0167337 A1* | 11/2002 | Chelcea | G06F 5/14 | 326/100 |
| 2003/0128101 A1* | 7/2003 | Long | G07C 9/00912 | 340/5.26 |
| 2003/0145281 A1* | 7/2003 | Thames | G06F 8/71 | 715/205 |
| 2003/0149764 A1* | 8/2003 | Beaulieu | H04L 45/02 | 709/224 |
| 2003/0233558 A1* | 12/2003 | Lieberman | G06F 9/4416 | 713/189 |
| 2004/0019571 A1* | 1/2004 | Hurwitz | G06Q 20/06 | 705/65 |
| 2005/0216753 A1* | 9/2005 | Dailey | G06F 21/572 | 713/191 |
| 2006/0212859 A1* | 9/2006 | Parker | G06F 8/51 | 717/143 |
| 2008/0209125 A1* | 8/2008 | Chen | G06F 13/387 | 711/115 |
| 2009/0113210 A1* | 4/2009 | Westerinen | G06F 21/52 | 713/187 |
| 2009/0249082 A1* | 10/2009 | Mattsson | G06F 21/6218 | 713/193 |
| 2010/0122088 A1* | 5/2010 | Oxford | G06F 21/10 | 713/168 |
| 2010/0153697 A1* | 6/2010 | Ford | G06F 21/31 | 713/2 |
| 2010/0205448 A1* | 8/2010 | Tarhan | G06F 21/33 | 713/185 |
| 2010/0214925 A1* | 8/2010 | Gormley | H04L 47/10 | 370/235.1 |
| 2010/0260044 A1* | 10/2010 | Gormley | H04L 47/10 | 370/230 |
| 2011/0126192 A1* | 5/2011 | Frost | G06F 8/61 | 717/178 |
| 2011/0213807 A1* | 9/2011 | Mattsson | G06F 21/6245 | 707/802 |
| 2011/0307947 A1* | 12/2011 | Kariv | H04L 63/08 | 726/9 |
| 2012/0253817 A1* | 10/2012 | Trinh | H04M 3/4935 | 704/270 |
| 2014/0115724 A1* | 4/2014 | van Brandenburg | G06F 21/10 | 726/30 |
| 2014/0196134 A1* | 7/2014 | Yamaguchi | G06F 21/44 | 726/7 |
| 2015/0193900 A1* | 7/2015 | Lau | G06K 9/325 | 382/100 |
| 2016/0101227 A1* | 4/2016 | Norris | A61M 1/166 | 604/29 |
| 2016/0101278 A1* | 4/2016 | Norris | A61M 1/166 | 604/29 |
| 2016/0156610 A1* | 6/2016 | Chen | H04L 63/12 | 726/9 |
| 2016/0171211 A1* | 6/2016 | Chen | G06F 12/1408 | 726/23 |
| 2016/0248686 A1* | 8/2016 | Lee | H04L 47/2475 | |
| 2017/0359354 A1* | 12/2017 | Matsugashita | H04L 63/08 | |
| 2018/0139205 A1* | 5/2018 | Devaney | H04L 63/062 | |

* cited by examiner

CONTINUED RUNTIME AUTHENTICATION OF INFORMATION HANDLING SYSTEM (IHS) APPLICATIONS

FIELD

This disclosure generally relates to Information Handling Systems (IHSs), and, more particularly, to systems and methods for continued runtime authentication of IHS applications.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes.

Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use, such as financial transaction processing, airline reservations, enterprise data storage, global communications, etc.

In addition, IHSs may include a variety of hardware and software components that may be configured to process, store, and communicate information; and may include one or more computer systems, data storage systems, and/or networking systems.

However, in today's fast-paced world, electronic files and data stored in an IHS is subject to "ransomware." Generally speaking, ransomware is a "malware" program that covertly installs itself on a victim's IHS, executes a crypto-virology attack (e.g., it uses a public encryption key to encrypt the victim's data, which only the attacker can undo using a private key corresponding to the public key), and then demands ransom payment from the victim in order to decrypt the otherwise "kidnapped" data. In many cases, ransomware stops all currently running processes—both user and system processes, including any antivirus programs—and takes control of the victim's IHS.

Typically, data encrypted by ransomware may be recovered only by: (a) paying the ransom and use the private key provided by the attacker to decrypt the data; or (b) ignoring the threat and relying on backup storage to get the latest version of the "kidnapped" data (assuming that the latest version is not the ransomware's encrypted version). With respect to option (b), however, the inventors hereof have recognized that backup services are costly and can raise privacy issues, for example, depending upon the location of the storage device (e.g., a remote server on a "cloud") and the importance or criticality of the data itself. There are no other techniques available for recovering data from a ransomware attack.

Accordingly, the inventors hereof have determined that protection and integrity of applications is becoming a critical front in mitigating sophisticated attacks. As opposed to data at rest, ransomware threats target the actual data consumer/generator and communication applications. To address these, and other concerns, the inventors hereof have developed systems and methods for runtime protection and integrity of applications to mitigated sophisticated attacks, such as ransomware or the like.

SUMMARY

Embodiments of systems and methods for continued runtime authentication of Information Handling System (IHS) applications are described. In an illustrative embodiment, an IHS may include one or more processors and a memory coupled to the one or more processors, the memory including program instructions stored thereon that, upon execution by the one or more processors, cause the IHS to: receive a command to execute an application; initially verify a plurality of tokens, where a first token is provided by the application, a second token is provided by an application manager, and a third token is provided by a hardware component within the IHS; and execute the application in response the initial verification being successful.

The first token may include a first value or string unique to the application, the second token may include a second value or string unique to the application manager, and the third token may include a third value or string unique to the hardware component or IHS.

The program instructions, upon execution, may further cause the IHS to perform a continued verification of at least two of the plurality of tokens after the initial verification has been successful and during execution of the application. For example, the continued verification may be performed periodically. Additionally or alternatively, the continued verification may be performed at one or more non-periodic, selected times.

The program instructions, upon execution, may further cause the IHS to shutdown the application in response to the continued verification being unsuccessful. Additionally or alternatively, the program instructions, upon execution, may further cause the IHS to shutdown the application manager in response to the continued verification having failed.

In some cases, the IHS may further comprise a Redundant Array of Independent Disks (RAID) system coupled to the one or more processors, where the RAID system has at least: a first storage device and a second storage device. The program instructions, upon execution, may further cause the IHS to copy data from the first storage device to the second storage device in response to the continued verification being successful. Moreover, the program instructions, upon execution, may further cause the IHS to abstain from copying data from the first storage device to the second storage device in response to the continued verification being unsuccessful.

In another illustrative, non-limiting embodiment, a method may implement one or more of the aforementioned operations. In yet another illustrative, non-limiting embodiment, a hardware memory device may have program instructions stored thereon that, upon execution by an IHS, cause the IHS to perform one or more of the aforementioned operations.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

In various embodiments, systems and methods described herein may provide techniques for continued runtime authentication of Information Handling System (IHS) applications. In some implementations, multiple tokens may be used to persistently validate local or cloud-based application(s), as well as permission(s) for application(s) to run in a designated or selected IHS environment.

For example, an application token and a (distinct) system token may be instituted, and an application manager may provide further its own token. After an application's launch is validated, subsequent token requests and processing may be periodic, event-based, or randomly implemented during the application's runtime (that is, while the application is being executed by the IHS). In many cases, attestation may start at the IHS system level, and it may continue with the application environment's validation.

As such, systems and methods described herein may provide techniques to recover ransomware-encrypted data locally (that is, locally with respect to the infected IHS). This may be achieved, for instance, by mirroring the data periodically (e.g., once or twice a day) based upon the presence and/or continued successful execution of a trusted service or application.

For example, in a Redundant Array of Independent Disks (RAID) system, data is written identically (or "mirrored") onto two or more storage drives (e.g., a first drive and a mirrored drive). A read request may be serviced by any drive in the RAID system, while identical write operations are performed on all drives. In these cases, using systems and methods described herein, a RAID controller may be configured such that mirroring is performed only if a trusted service or application is being executed.

Accordingly, if an IHS is attacked by ransomware, the ransomware may itself first encrypt data on the RAID disks, and then stop all user and system level processes, including the trusted service or application. When the trusted service or application is stopped, however, an IHS implementing techniques described herein would not update the mirrored disk with ransomware's encrypted data (because the secure application is no longer running), thus allowing a ransomware victim to recover the last version of the data from the mirrored disk.

Figure 1:
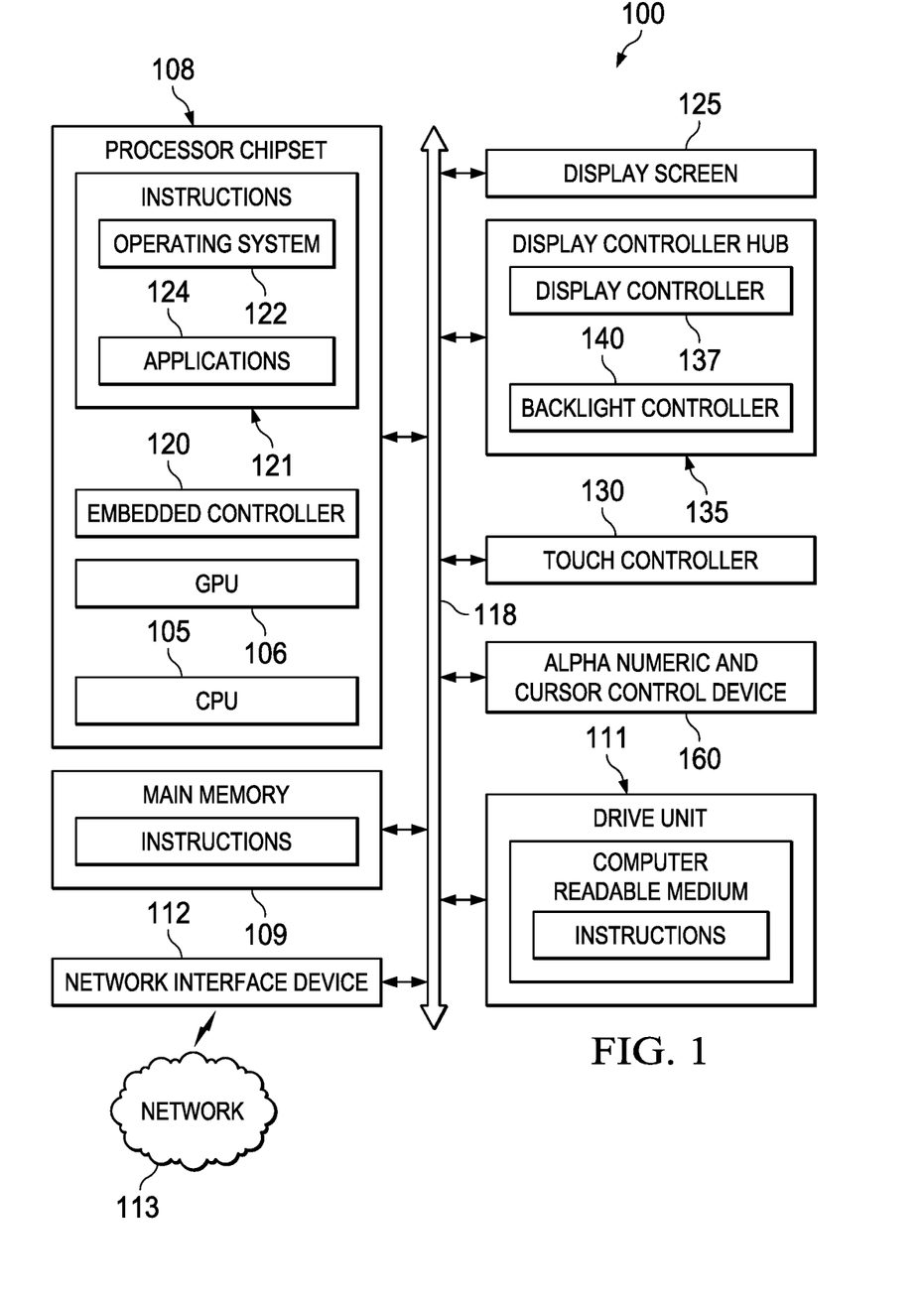
FIG. 1 is a diagram of an example of an Information Handling System (IHS) configured according to some embodiments.

Turning now to FIG. 1, a diagram of an Information Handling System (IHS) 100 configured to implement methods for continued runtime authentication is depicted. In various embodiments, IHS 100 may include a set program instructions that can be executed to cause IHS 100 to perform one or more of the operations disclosed herein.

In various environments, IHS 100 may be implemented using electronic devices that provide voice, video or data communications. Further, while a single IHS 100 is illustrated, the term "system" shall also be taken to include any collection of systems or sub-systems that individually or jointly execute a set, or multiple sets, of instructions to perform one or more computer operations.

IHS 100 includes main memory 109, one or more processing resources such as a Central Processing Unit (CPU) 105 or hardware or software control logic, and operates to execute code. Additional components of IHS 100 may include one or more storage devices such as static memory or disk drives 111. These memory devices 109 and/or 111 can store code and data. In various embodiments, devices 109 and/or 111 may be implemented using any suitable memory technology, such as static RAM (SRAM), synchronous dynamic RAM (SDRAM), nonvolatile/Flash-type memory, or any other type of memory.

Storage device 111 may be an internal or external device coupled to IHS 100 via a local bus or port. For example, such a bus or port may include implementations of various version of the Universal Serial Bus (USB) protocol. Additionally or alternatively, storage device 111 may include a Common Internet File System (CIFS) and/or Network-Attached Storage (NAS).

Other components of IHS 100 may include one or more communications ports for communicating with external devices as well as various input and output (I/O) devices. I/O devices may include alphanumeric and cursor control devices 160 such as a keyboard, a touchpad, a mouse, one or more video display devices 125, display touchscreen(s) with touch controllers 130, etc. IHS 100 may also include one or more buses 118 operable to transmit communications between the various hardware components.

Again, IHS 100 may include one or more processing resources such as CPU 105, Graphics Processing Unit (GPU) 106 that may or may not be integrated with CPU 105, and related chipset(s) 108 or hardware or software control logic.

In various embodiments, IHS 100 may be a single-processor system including one CPU or a multi-processor system including two or more CPUs (e.g., two, four, eight, or any other suitable number). CPU(s) 105 may include any processor capable of executing program instructions. For example, in various embodiments, CPU(s) 105 may be general purpose or embedded processors implementing any of a variety of Instruction Set Architectures (ISAs), such as the x86, POWERPC®, ARM®, SPARC®, or MIPS® ISAs, or any other suitable ISA. In multi-processor systems, each of CPU(s) 105 may commonly, but not necessarily, implement the same ISA.

IHS 100 may include several sets of instructions 121 to be run by CPU 105, GPU 106, and/or any embedded controllers 120 on IHS 100. One such set of instructions includes Operating System (OS) 122 with an OS interface.

Examples of OSs 122 may include those used with typical mobile computing devices such as WINDOWS mobile OS from MICROSOFT CORPORATION and ANDROID OS from GOOGLE, INC. Additional sets of instructions in the form of multiple software applications 124 may be run by IHS 100. These applications 124 may enable multiple uses of IHS 100.

IHS 100 may operate as a standalone device or may be connected to other computer systems or peripheral devices. IHS 100 can represent a server device whose resources can be shared by multiple client devices, or it can represent an individual client device, such as an individual mobile personal computing system.

Network interface device 112 may include a wireless cellular or mobile networks (CDMA, TDMA, etc.), WIFI, WLAN, LAN, or similar network connection, enabling a user to communicate via a wired or wireless communications network 113, such as the Internet. IHS 100 may be configured with conventional web browser software. The web browser may include for example MICROSOFT's Internet Explorer web browser software, FIREFOX or similar such browsers to allow the user to interact with websites via network 113.

IHS 100 also includes one or more display devices 125 that may utilize LCD, OLED, or other thin film technologies. Each display device 125 may be capable of touch input via touch controller 130. Each display device 125 has a display controller hub 135. The display controller hub 135 may include control logic and software or access separate control logic and software. Components may include a display controller or driver 137 and a backlight controller 140 for LCD thin film display technologies or a brightness controller for OLED/AMOLED technologies.

One or more parts of the display controller hub 135 may be operated by or integrated with one or more graphics processing units (GPUs) 106 such as those that are part of the chipset 108. Display device 125 and one or more parts of display controller hub 135 may also be controlled by embedded controller 120 of chipset 108. Each GPU 106 and display controller/driver 137 is responsible for rendering graphics such as software application windows and virtual tools on display device 125.

In various embodiments, devices 109 and/or 111 may include one or more "file systems." As used herein, the term "file system" refers to systems and data structures that OS 122 uses to keep track of "files" on a given disk or storage partition; that is, the way the files are organized. Generally speaking, a file system may include one or more kernel-mode components that are executed as part of an OS (e.g., WINDOWS).

It should be noted that IHS 100 is provided as an example IHS, but that numerous variations will be apparent to a person of ordinary skill in the art in light of this disclosure. For example, in various deployments, IHS 100 may be implemented as a desktop or a server, in which case IHS 100 may lack an integrated display, a backlight, a touch controller, etc.

Figure 2:
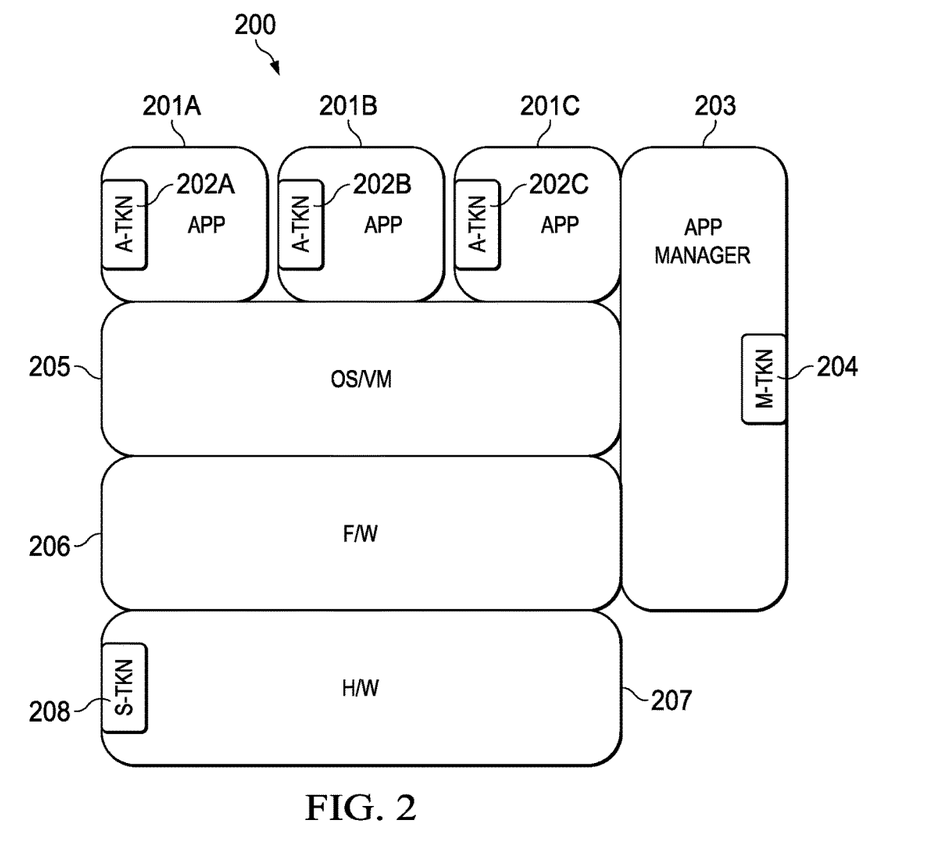
FIG. 2 is a diagram of an example of a system for continued runtime authentication according to some embodiments.

FIG. 2 is a diagram of an example of system 200 for continued runtime authentication. In some embodiments, system 200 may be configured to perform method 300 shown in FIG. 3 below.

As shown, secure applications 201A-C each includes its own token (A-TKN) 202A-C, respectively. Each A-TKN 202A-C includes a first value or string unique to its respective application 201A-C. And each application 201A-C is executed by Operating System (OS) or Virtual Machine (VM) component 205. OS/VM component 205 sits above firmware (F/W) level component 206, which in turn sits above hardware component 207, also having its own token (S-TKN) 208. S-TKN 208 includes a value or string unique to IHS 100.

Application manager 203 may be executed as one of applications 201A-C, and it has its own token (M-TKN) 204. Similarly as the previously described tokens, M-TKN 204 may also include a value or string unique to the application manager 203. Unlike applications 201A-C, however, application manager 203 may have direct access to different levels or components of system 200 including, for example F/W component 206. In various embodiments, application manager 203 may be configured to perform one or more of the techniques described herein.

In relation to IHS 100, applications 201A-C and/or 204 may be implemented as applications 124, and OS/VM 205 may be implemented as Operating System 122. Both F/W level component 206 and hardware component 207 may be implemented by one or more components within processor chipset 108, which may also include a Basic Input/Output System (BIOS) or the like (not shown here for conciseness).

Figure 3:
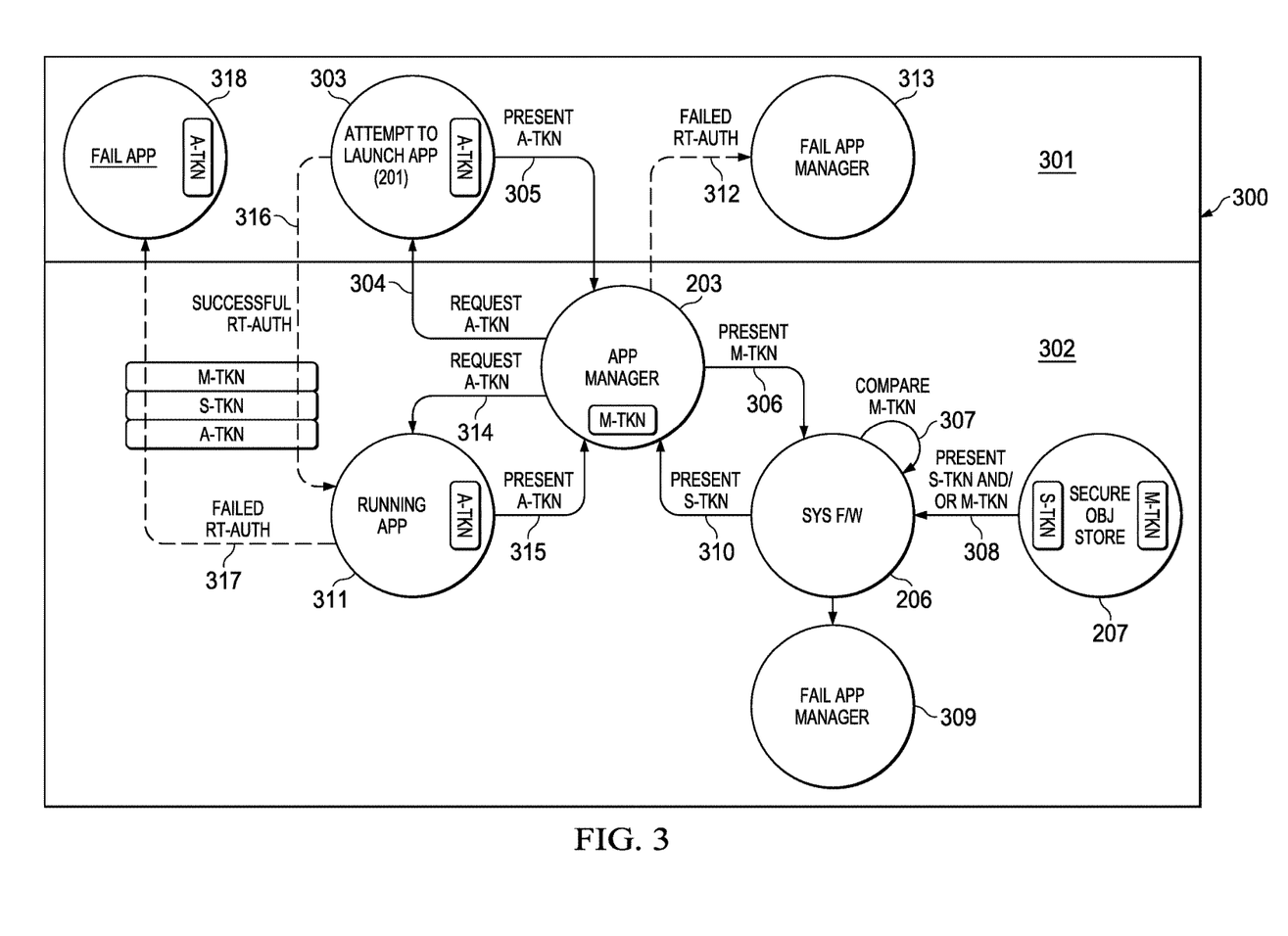
FIG. 3 is a diagram of an example of a method for continued runtime authentication according to some embodiments.

FIG. 3 is a diagram of an example of method 300 for continued runtime authentication (RT-Auth) according to some embodiments. Method 301 is divided into application portion 301 and runtime authentication portion 302, the latter being managed by application manager 203 shown in FIG. 2 above.

At stage 303, a user attempts to launch or execute application 201. In response, application manager 203, which has its own M-TKN, intercepts the launch, quarantines (or pauses execution of) application 201, and requests an A-TKN from that application at 304. Application 201 (still quarantined or paused) presents its A-TKN to application manager 203 at 305. At the same time, the application manager 203 presents its M-TKN to F/W component 206 at 306.

F/W component 206 validates M-TKN at 307 and, if validation of M-TKN is successful at 307, F/W component 206 retrieves S-TKN from a secure object store (e.g., a BIOS "mailbox" or other secure non-volatile memory within hardware component 207). In some cases, M-TKN may also be stored in secure object store 207.

If F/W component 206 cannot successful validate the M-TKN token provided by application manager 203, the application manager 203 fails at state 309. Conversely, if F/W component can validate the M-TKN token, then F/W component 206 provides S-TKN token to application manager 203 at 310.

At this point, application manager 203 is in possession of all three tokens, A-TKN, M-TKN, and S-TKN, and may perform any operation upon these values or strings (e.g., comparisons, hashes, etc.) to determine, for example: (a) whether application 201 is allowed to be executed by IHS 100, (b) whether application manager 203 is itself allowed to be executed by IHS 100 (self-check), and/or (c) whether IHS 100 is itself the proper designated or selected IHS environment to execute application 201 and/or application manager 203 (another self-check).

Upon initial verification at least two or more of the three tokens (and, in many cases, all three), application 201 may be de-quarantined and allowed to run on IHS 100 at state 311. Yet, while application 201 is executed in state 311, application manager 203 may perform a continued verification of at least two of the of tokens (and again, in many cases, all three).

For example, the continued verification may be performed periodically. Additionally or alternatively, the continued verification may be performed at one or more non-periodic, selected times. Additionally or alternatively, the continued verification may be performed in response to an ongoing event (e.g., detection of malware by an antivirus program, connection or a wired or wireless device to IHS 100), an impending event (e.g., an attempted backup operation, an attempted launch of another application, etc.), and/or an expected event (e.g., the IHS 100 goes into or gets out of a low-power or sleep mode).

At each continued verification, application manager 203 may request at 314 (periodically, randomly, event-based, etc.) the same A-TKN from application 201 executed at state 311. And, in response to each request 314, application 201 may again present A-TKN at 315 to application manager 203. Similarly, application manager 203 may continue to request the S-TKN from F/W component 206, and may continue to identify its own M-TKN, thereby processing all 3 tokens which, if verified and allows app to continue to run in state 311.

Should M-TKN and/or S-TKN not check during the continued verification process, application manager 203 may fail at 312 and enter state 313, similarly as state 309 of the initial token verification. Moreover, should A-TKN not check during the continued verification process at 317, application 201 may entered failed state 318.

In many embodiments, method 300 may be repeated until application 201 is closed or retired, and/or when IHS 100 is turned off. In response to a successful real-time, persistent and/or continued authentication, application 201 is allowed to run. Otherwise, if the continued verification fails due to any of the tokens not checking, any selected remedial action may be performed (e.g., alert a user, stop all applications, backup data, etc.)

Figure 4:
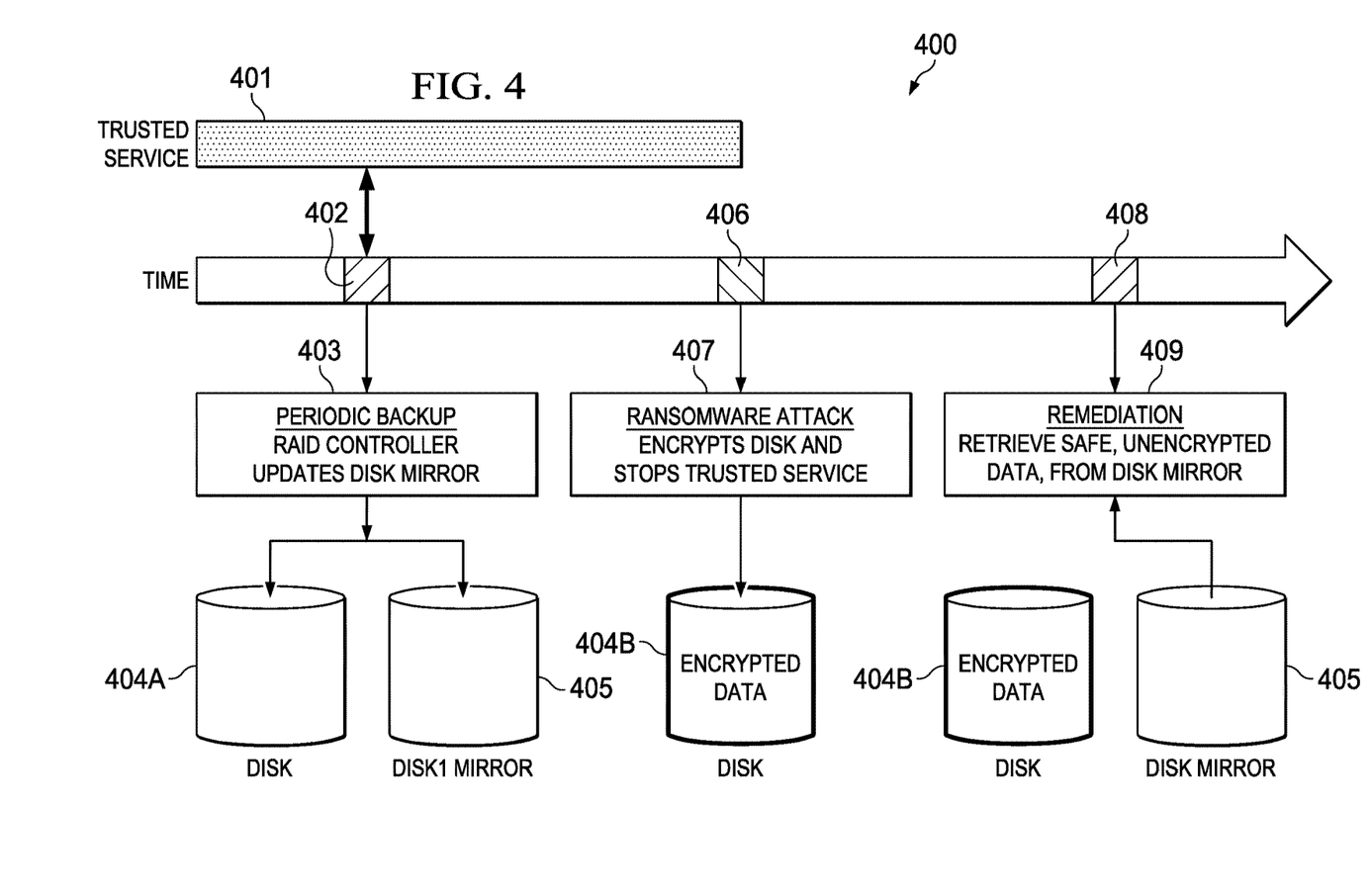
FIG. 4 is a diagram illustrating an implementation of systems and methods for continued runtime authentication according to some embodiments.

To better illustrate the foregoing, FIG. 4 is a diagram of an example implementation of systems and methods for continued runtime authentication, according to some embodiments. Initially, trusted service 401 (e.g., one of applications 201) is verified and then launched by IHS 100 using the initial verification process of method 300. Trusted service 401 is then allowed to continue to run, so long as the continued verification process of method 300 is successful.

During normal operation and at time 402, a RAID controller or system coupled to IHS 100 (either locally or via network 113) invokes a routine 403 that copies the data from disk 404A (e.g., an instance of drive unit 111) to disk mirror 404B (e.g., a different instance of drive unit 111), such that the same data stored in disk 404A is also stored in disk mirror 405B. Backup operation 403 is typically performed periodically. Additionally or alternatively, backup 403 may be performed continuously in time. In various embodiments, however, IHS 100 may be configured such that backup operation 403 is performed only contingent upon trusted service 401 still being continually verified using method 300.

At time 406, a ransomware or other malware attack 407 infects IHS 100, by encrypting disk 404A into encrypted disk 404B with an encryption key (e.g., a public key) unknown to the user of IHS 100, and stopping all running services and applications, including trusted service 401. Because trusted service 401 is no longer running (e.g., state 318 in FIG. 3), however, the backup operation is no longer performed, and the encrypted data of disk 404B is not copied to disk mirror 405. As such, that the data previously stored in disk mirror 405 remains safe from attack 407 and therefore still unencrypted by the ransomware's public key.

Then, at a later time 408, remediation action 409 may retrieve safe, unencrypted data from disk mirror 405, which has been unaffected because backup operation 403 did not copy the encrypted, kidnapped data from disk 404B to disk mirror 405.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising: one or more processors; and
a memory coupled to the one or more processors, the memory including program instructions stored thereon that, upon execution by the one or more processors, cause the IHS to:
receive a command to execute an application;
initially verify a plurality of tokens, wherein a first token is provided by the application, a second token is provided by an application manager, and a third token is provided by a hardware component within the IHS;
execute the application in response the initial verification being successful; and
perform a continued verification of at least two of the plurality of tokens after the initial verification has been successful and during execution of the application.

2. The IHS of claim 1, wherein the first token includes a first value or string unique to the application, wherein the second token includes a second value or string unique to the application manager, and wherein the third token includes a third value or string unique to the hardware component or IHS.

3. The IHS of claim 1, wherein the continued verification is performed periodically.

4. The IHS of claim 1, wherein the continued verification is performed at one or more non-periodic, selected times.

5. The IHS of claim 1, wherein the program instructions, upon execution, further cause the IHS to shutdown the application in response to the continued verification being unsuccessful.

6. The IHS of claim 1, wherein the program instructions, upon execution, further cause the IHS to shutdown the application manager in response to the continued verification having failed.

7. The IHS of claim 1, further comprising a Redundant Array of Independent Disks (RAID) system coupled to the one or more processors, wherein the RAID system has at least: a first storage device and a second storage device.

8. The IHS of claim 7, wherein the program instructions, upon execution, further cause the IHS to copy data from the first storage device to the second storage device in response to the continued verification being successful.

9. The IHS of claim 7, wherein the program instructions, upon execution, further cause the IHS to abstain from copying data from the first storage device to the second storage device in response to the continued verification being unsuccessful.

10. A hardware memory device having program instructions stored thereon that, upon execution by an Information Handling System (IHS), cause the IHS to:
receive a command to execute an application;
initially verify a plurality of tokens, wherein a first token is provided by the application, a second token is provided by an application manager, and a third token is provided by a hardware component within the IHS;
execute the application in response the initial verification being successful; and
perform a continued verification of at least two of the plurality of tokens after the initial verification has been successful and during execution of the application.

11. The hardware memory device of claim 10, wherein the program instructions, upon execution, further cause the IHS to shutdown at least one of the application or the application manager in response to the continued verification being unsuccessful.

12. The hardware memory device of claim 10, further comprising a Redundant Array of Independent Disks (RAID) system coupled to the one or more processors, wherein the RAID system has at least: a first storage device and a second storage device, and wherein the program instructions, upon execution, further cause the IHS to copy data from the first storage device to the second storage device in response to the continued verification being successful.

13. The hardware memory device of claim 10, further comprising a Redundant Array of Independent Disks (RAID) system coupled to the one or more processors, wherein the RAID system has at least: a first storage device and a second storage device, and wherein the program instructions, upon execution, further cause the IHS to abstain from copying data from the first storage device to the second storage device in response to the continued verification being unsuccessful.

14. A computer-implemented method, comprising:
receiving, at an Information Handling System (IHS), a command to execute an application;
initially verifying, via the IHS, a first token provided by the application, a second token provided by an application manager, and a third token provided by a hardware component within the IHS;
executing the application, by the IHS, in response the initial verification being successful; and
performing a continued verification of at least two of the tokens after the initial verification has been successful and during execution of the application.

15. The computer-implemented method of claim 14, further comprising shutting down at least one of the application or the application manager in response to the continued verification being unsuccessful.

16. The computer-implemented method of claim 14, wherein the IHS is coupled to a Redundant Array of Independent Disks (RAID) system, wherein the RAID system has at least: a first storage device and a second storage device, and wherein the method further comprises copying data from the first storage device to the second storage device in response to the continued verification being successful.

17. The computer-implemented method of claim 14, wherein the IHS is coupled to a Redundant Array of Independent Disks (RAID) system, wherein the RAID system has at least: a first storage device and a second storage device, and wherein the method further comprises abstaining from copying data from the first storage device to the second storage device in response to the continued verification being unsuccessful.

* * * * *